United States Patent
Fulop et al.

[11] Patent Number: 5,877,585
[45] Date of Patent: Mar. 2, 1999

[54] MOUNTING ASSEMBLY ARRANGEMENT FOR A COMPACT FLUORESCENT LAMP

[75] Inventors: Jozsef Fulop, Thokoly; Istvan Wursching, Erzsebet, both of Hungary

[73] Assignee: General Electric Company, Schenectady, N.Y.

[21] Appl. No.: 543,538

[22] Filed: Oct. 16, 1995

[30] Foreign Application Priority Data

Oct. 18, 1994 [HU] Hungary ................................ P9402991

[51] Int. Cl.⁶ ...................................................... H01J 5/50
[52] U.S. Cl. ................................ 313/318.02; 313/318.01; 313/318.09; 313/318.1; 439/611
[58] Field of Search ...................... 313/318.02, 318.01, 313/318.05, 318.09, 318.1, 623, 624; 439/611, 612, 617, 619

[56] References Cited

U.S. PATENT DOCUMENTS

| 4,404,491 | 9/1983 | Siaens et al. ...................... 313/318.02 |
| 5,068,249 | 11/1991 | Blaisdell et al. . |
| 5,285,128 | 2/1994 | Hórvath et al. ..................... 313/318.02 |

FOREIGN PATENT DOCUMENTS

| 2739554 A1 | 3/1978 | Germany . |
| 3410827 A1 | 9/1985 | Germany . |
| 4012684 A1 | 10/1991 | Germany . |
| 62-115625 | 5/1987 | Japan ................................. 313/318.02 |

*Primary Examiner*—Nimeshkumar Patel
*Attorney, Agent, or Firm*—George E. Hawranko

[57] ABSTRACT

The discharge lamp has a discharge tube filled with a fill gas and sealed in a gas-tight manner and a cap part made to be suitable for connection to a socket. This cap part has a housing made by a shell and a closing member fixed thereto, and electrical contact components. The shell has openings for receiving the end portions of the discharge tube legs into the housing and the shell is made to be suitable for supporting the discharge tube mechanically. The electrical contact components are embedded in the housing and connected in the inner space of the housing to the electrodes of the discharge lamp and protrude from the cap part. The cap part contains mechanical support component(s) for fixing the discharge lamp in the socket. The mechanical support component(s) forms (form) a part of the shell and the portions of the electrical contact components protruding from the cap part are placed in an outwardly open indentation defined by an indented plate portion of a bordering plate of the cap part, preferably of the base plate of the closing member.

19 Claims, 2 Drawing Sheets

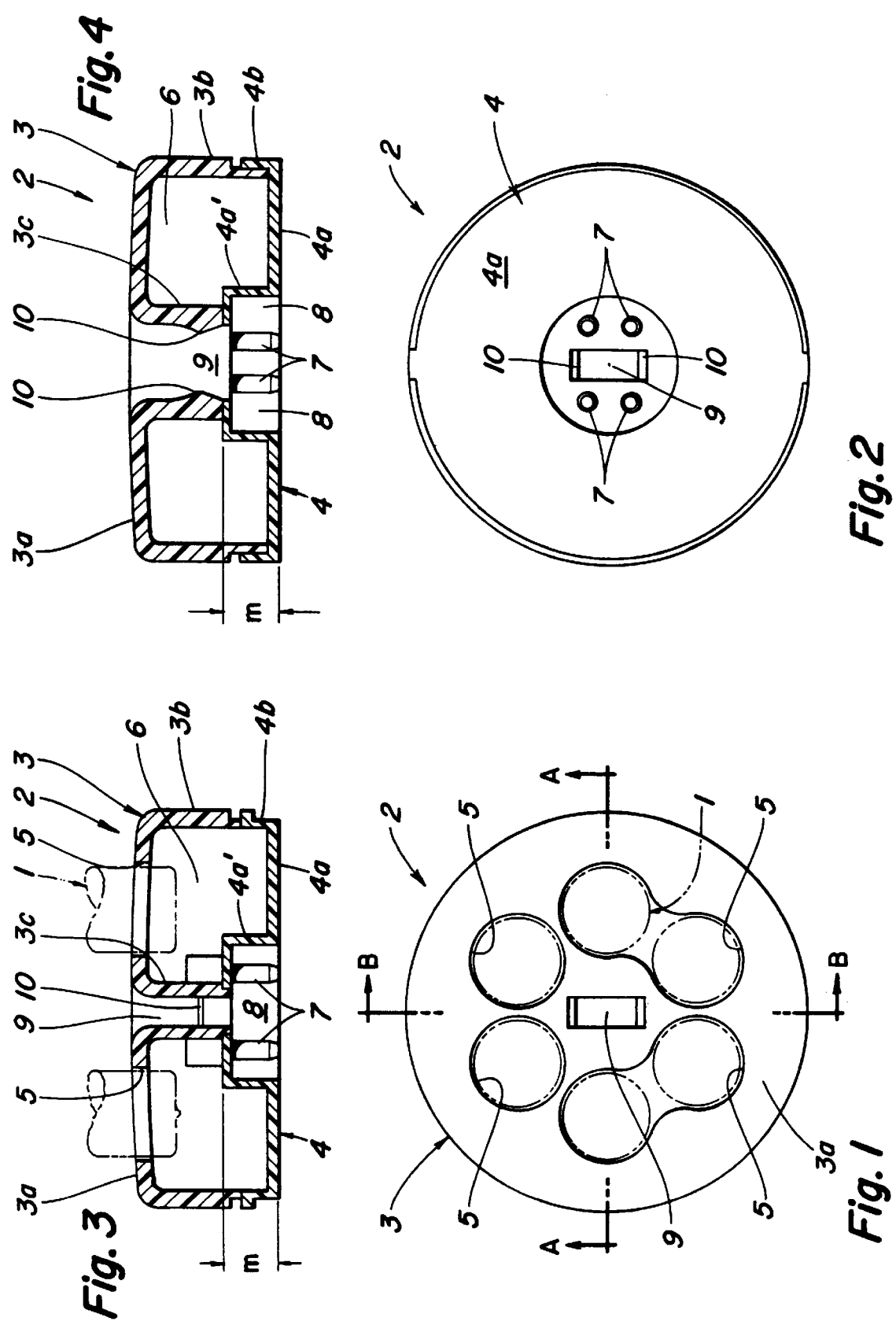

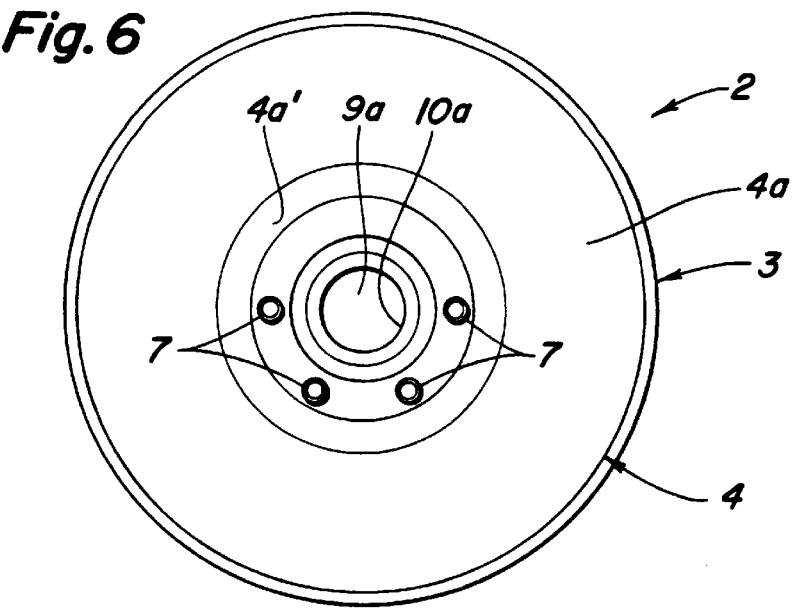
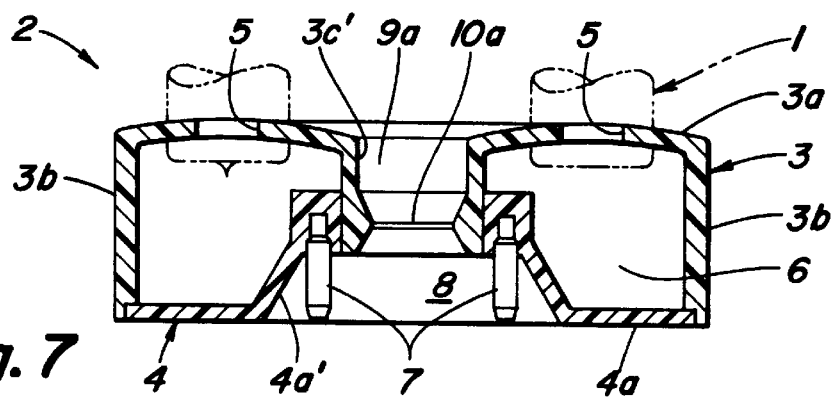
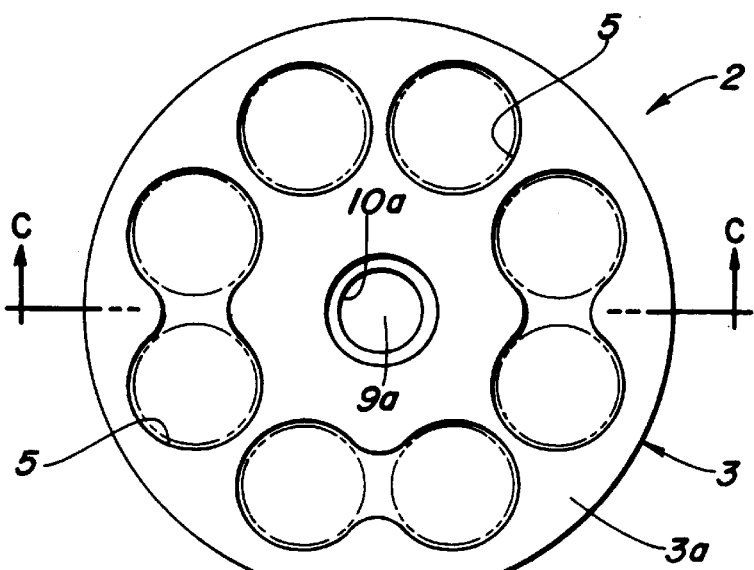

MOUNTING ASSEMBLY ARRANGEMENT FOR A COMPACT FLUORESCENT LAMP

FIELD OF THE INVENTION

This invention relates to a compact fluorescent lamp having a mounting and contact arrangement that allows for an efficient assembly of the lamp. More particularly, this invention relates to such a mounting and a contact arrangement that results in a more positive assembly of the lamp envelope and support cap for the attachment to a ballast housing.

BACKGROUND OF THE INVENTION

It is known that the various types of discharge lamps commonly referred to as compact fluorescent lamps, have discharge tubes containing electrodes, filled with a fill gas and sealed in a gas-tight manner, to which discharge tube a cap part being in connection with a power source and suitable for being inserted into a socket, is connected at one or both ends of the discharge tube. In case of single-ended plug-in compact discharge lamps provided with a separate operating unit (e.g., an adaptor type compact fluorescent lamp having a separate ballast circuit and housing arrangement), the cap part consists of a support shell and a closing member fixed to the shell which together, fixed to each other by their rims, make a housing. The shell serves for fixing and supporting the parallel discharge tube legs that are preferably still connected with each other to have the same inner space, the discharge tube legs protrude into the inside of the housing through the openings formed in the base plate. The discharge tube legs extend into the housing but do not reach the base plate of a closing member. The contact members protrude outwardly from the base plate of the closing member and are fixed in the housing, preferably in the base plate of the closing member. The contact members are connected to the electrodes of the discharge tube by means of electrically conducting wires inside the housing.

Fixing the discharge lamp in the socket is ensured by a bossage in the closing member of the cap part, which bossage snaps into a seat formed in the socket for this purpose when the lamp is inserted into the socket. In this instance, the socket referred to is the socket formed in the lower housing member; that is, the discharge lamp of the present invention is configured in the form of an adaptor type of lamp product. The bossage can be placed in the socket also, forming a part of it, but in this case the closing member has to be provided with a seat which the bossage of the socket snaps in.

A disadvantage of the discharge lamp construction described here is that when the cap part is inserted into the socket and particularly when, for disconnection, is pulled out from it, a very great force (load) can be exerted on the mechanical joint between the shell and the closing member. The closing member of the cap part is exposed to critical loads primarily in pulling out the cap part from the socket so that the cap part is gripped at the shell or the discharge tube (so, indirectly at the shell) since to remove the bossage previously snapped into the seat, a rather great force has to be exerted, which is transferred directly to the closing member. It is a further problem that if the contact members (pins) protrude from the closing member there is an increase in the length of the discharge lamp on one part and on the other, the contact members can be easily damaged. The risk of damage is especially high when the user of the discharge lamp is attempting to disconnect it from the socket. The reason for this is that the contact members are in general not guided to fit into the sleeves in the socket formed to accept them and so when the discharge lamp is inserted into the socket by the user, the contact members usually do not fit at once into the sleeves formed to accept them and the user has to turn the discharge lamp back and forth until the contact members find their sleeves and during this process, the contact members can bend or become damaged.

SUMMARY OF THE INVENTION

The objective of the invention was to provide a single-ended discharge lamp with a minimum sensitivity to damage both in respect to the joint between the shell and the closing member and of the contact members, and also to do so with a minimum size.

The invention is based on the recognition that, on one part if the mechanical fixing components for connecting the discharge lamp to the socket are formed or placed on the shell, the loads occurring in pulling out (and insertion) affect directly the shell being able to withstand these rather than the closing member being sensitive to tear, and on the other part if the contact members (pins) are placed in an inwardly directed indentation of the closing member so that they are still placed inside the outer enveloping surface of the cap part, but of course outside the housing, and do not protrude from it, the pins will be protected from outside mechanical effects and in addition the length of the discharge lamp will be reduced.

Based on the above recognition, the objectives set were, according to the invention, achieved by providing a single-ended discharge lamp having a discharge tube comprising electrodes filled with a fill gas and sealed in a gas-tight manner and also having a cap part made to be suitable for connection to a socket, which cap part has a housing comprising a shell and a closing member fixed to each other and also has electrical contact members. The shell is provided with openings enabling the introduction of the end portions of the discharge tube legs into the housing. The shell is formed to be suitable to support the discharge tube mechanically. The electrical contact members are embedded in the housing, are connected in the inner space of the housing to the electrodes of the discharge tube and protrude from the housing. The housing also has mechanical support component(s) for securing the discharge lamp in the socket characterized in that the mechanical support component(s) forms (form) a part of the shell and the portions of the electrical contact members protruding from the cap are placed in an outwardly open indentation defined by an indented plate portion of a bordering plate of the cap part, preferably of the base plate of the closing member. The contact members preferably extend at most, to the bordering plane of the housing of the cap part. In a preferred embodiment, the shell contains a through central opening bordered by a wall forming a part of the of the shell, and the mechanical support component(s) is (are) made of portion(s) protruding from this wall and extending into the opening. It is preferable in this case if the opening has a rectangular cross-section and the mechanical support components are made by two bossages protruding from the surfaces of the two bordering walls of the opening being opposite to each other. It is also possible to use a solution in which the opening has a circular cross-section and the mechanical support component is made by an annular rib protruding from the bordering wall of the opening towards the inside of the opening and extending over the perimeter of the circle. In general, it is preferable to form the mechanical support component(s) integrally with the shell. It is emphasized that other construction solutions should be considered to be within the scope of the invention wherein the mechanical support component(s) for the cap part and the socket is (are) made by seat(s) belonging to the shell.

BRIEF DESCRIPTION OF THE DRAWINGS

The invention will be described in further details by means of attached drawings that show examples for its preferred embodiments.

In the drawings:

FIG. 1 shows the top view of a discharge lamp constructed according to the invention and having a discharge tube directed vertically upwards;

FIG. 2 is the bottom view of the discharge lamp shown in FIG. 1;

FIG. 3 is a sectional view taken along the line A—A indicated in FIG. 1;

FIG. 4 is a sectional view taken along the line B—B indicated in FIG. 1;

FIG. 5 shows the top view of another embodiment of a discharge lamp constructed according to the invention and also having a discharge tube directed vertically upwards;

FIG. 6 is the bottom view of the discharge lamp shown in FIG. 5; and

FIG. 7 is a sectional view taken along the line C—C indicated in FIG. 5.

DETAILED DESCRIPTION OF THE INVENTION

The single-ended discharge lamp according to FIGS. 1 through 4 is shown as a Hex type compact fluorescent lamp having two main parts: the discharge tube 1 and the cap part 2 connected to it which, inserted into a socket (not shown), can be connected to a power source. As illustrated, the discharge lamp of the present invention is commonly known as an adaptor configuration whereby the tube 1 and cap portion 2 are inserted in a base portion (not shown) which is then typically screwed into a conventional edison socket. A ballast circuit arrangement whether electronic or magnetic can be contained within the base portion. The cap 2 is composed of a shell 3 and a closing member 4 fixed to it and these make a housing having an inner space 6 (FIGS. 3 and 4). The shell 3 has a base plate 3a and a flange 3b extending downwards and directed perpendicularly or essentially perpendicularly to the plane of the base plate 3a. The flange 4b of base plate 4a of the closing member 4, which extends upward in this example, is connected to the lower end of this flange 3b by means of either a releasable or permanent joint. In the base plate 3a of the shell 3 openings 5 are formed, the shape and size of which are chosen corresponding to the shape and size of the discharge tube 1 and the parallel legs of the discharge tube 1. In the region of their outside ends, the leg portions of the discharge tube are interconnected so as to form one internal discharge space and are introduced into the inner space 6 of the housing through these openings 5 and fixed in this inner space 6, e.g., by means of an adhesive. (It is noted that, for the ease of survey two tube legs of the discharge tube 1 are shown in FIG. 3 only, by a dashed line and broken.) The discharge tube 1 sealed in a gas-tight manner and filled with a fill gas is, in a way known in itself, always made by legs of even number and, according to the invention discharge lamps with six (Hex), eight (Oct) (or even more) tube legs can be basically formed since, as shown in the following description, these lamps have enough space between the legs for using the solution according to the invention. Two of the tube legs contain electrodes, the inleads of which (two electrically conducting wires for each, not shown) are connected to contact members 7 embedded in the closing member 4 of the cap part 2, the contact members extend out from the inner space of the housing 6 through the base plate 4a of the closing member 4. The discharge lamp, as seen in FIGS. 2 through 4 also, has four contact members 7 (pins).

In accordance with the invention, on that side of the housing 6 made by the shell 3 and the closing member 4 where the contact members 7 extend from the base plate 4a of the closing member 4, a void, i.e., an outwardly open indentation 8 is formed. The extent of protrusion of the contact members 7, in other words, the depth m of the indentation (see FIGS. 3 and 4) is chosen so that they do not protrude outwards from the indentation 8 beyond the plane of the base plate 4a of the closing member 4. In this way the contact members 7 are effectively protected against outside mechanical effects. In this embodiment, the indentation 8 is formed by a plate portion 4a' of the base plate 4a of the closing member 4, which plate portion 4a' is bent twice with a right angle.

In accordance with the invention the shell 3 of the cap part 2 has a central through opening 9 bordered by an inner wall 3c belonging to the shell 3. In case of the embodiment according to FIGS. 1 through 4, the top and bottom view of this opening 9 is rectangular in shape and is placed between two contact components 7 at each side (FIGS. 2 and 3). In this opening 9, beginning at the shorter opposite sides of the rectangle, formed to make one member with the inner wall 3c and protruding from it, two mechanical support components 10, i.e., bossages protrude that snap into the seats of a socket (not shown) intended to make a joint with the bossages. Thus, these support components 10 form a part of the shell 3 and so when, e.g., the user pulls the discharge lamp out from the socket, the loads occurring affect the shell itself rather than the closing member 4 being sensitive to tear.

The embodiment shown in FIGS. 5 through 7 relating to Oct type compact fluorescent lamps, differs from that shown in FIGS. 1 through 4 in respect of the construction solutions according to the invention only and so the identical construction components are designated with the reference numbers already used. The fundamental difference between the two embodiments is that in this case the top and bottom view of the central through opening bordered by the annular inner wall 3c' of the shell 3 is circular in shape and the mechanical support component 10a is made by an annular rib that snaps into the corresponding slot of the socket (not shown). Here the indentation 8 is bordered by the plate portion 4a' of the closing member 4 which plate portion 4a' is directed obliquely inwards and upwards and of course, the contact components 7 do not protrude from the indentation 8 in this case also.

The invention has the advantage of fundamental importance in that it provides a construction that is much less sensitive to damages that could otherwise be caused by outside mechanical impacts. It is a further advantage that having placed the mechanical support components for connection to the socket in the space inside the cap part, between the discharge tube legs protruding into the cap part, in contrast to the presently known single-ended discharge lamps where these support components are place outside, the size of the cap part has been reduced which resulted in the reduction of size of the discharge lamp.

The invention, of course, is not limited to the embodiments described in detail beforehand but can be implemented in several ways within the scope of protection defined by the claims.

We claim:

1. A single-ended discharge lamp comprising a housing supporting at least one discharge tube and electrical connectors for connecting the lamp to a power supply, the housing having openings into which end portions of each discharge tube extend the housing having two parts connected together, the end portion of the discharge tube being fixed to and supported by one part, said one part defining an opening for receiving a projection of the power supply and which detains the lamp on the power supply, the opening having a detent for engaging the projection.

2. A lamp according to claim 1 wherein the openings through which the end portions of each discharge tube extend are in said one part.

3. A lamp according to claim 2 wherein the electrical connectors are supported by the other of the two parts.

4. A lamp according to claim 3 wherein the electrical connectors are in a recess within said other part.

5. A lamp according to claim 1 wherein the opening extends substantially through a central portion of the one part.

6. A lamp according to claim 5 wherein the opening extends through the one part in a direction parallel to longitudinal axes of the discharge tube end portions.

7. A single-ended discharge lamp comprising at least one discharge tube, a housing including two parts fixed together and supporting end portions of each tube and electrical connectors for connecting the lamp to a power supply, the housing defining openings through which the end portions of each discharge tube extend and having means for mechanically connecting the lamp to the power supply, one part of the housing defining said openings, supporting the end portions of each tube and providing the means for mechanically connecting the lamp to the power supply and the electrical connectors are supported by the other part and are in a recess therein.

8. A lamp according to claim 7 wherein the means for mechanically connecting the lamp to a power supply comprises an opening defined in said one part.

9. A lamp according to claim 8 comprising at least one projection in the opening for engaging with a member of the power supply received in the opening.

10. A lamp according to claim 8 wherein the opening is rectangular.

11. A lamp according to claim 8 wherein the opening is circular.

12. A lamp according to claim 7 wherein the means for mechanically connecting includes an opening extending substantially parallel to longitudinal axes of the discharge tube end portions at an interior portion of the one part.

13. A lamp according to claim 7 wherein the means for mechanically connecting includes an opening formed in an interior portion of the one part.

14. A lamp according to claim 13 wherein the opening extends through the interior portion of the one part.

15. A single-ended discharge lamp comprising:

at least one discharge tube having end portions;

a first housing member having openings for receiving and supporting the end portions of the discharge tube;

a second housing member fixed to the first housing member and including a recess; and a plurality of electrical connectors electrically connected to electrical contacts of the discharge tube and mounted on the second housing member within the recess.

16. A lamp according to claim 15 wherein the plurality of electrical connectors are entirely contained within the recess.

17. A lamp according to claim 15 wherein an opening is formed in the first part and the second part for receiving a projection of a power supply for mechanically connecting the lamp to the power supply.

18. A lamp according to claim 17 wherein the opening includes a detent for engaging the projection.

19. A lamp according to claim 18 wherein the opening in the first and second parts extends axially through the first and second parts.

* * * * *